US 6,609,837 B2

(12) United States Patent  
Lampert

(10) Patent No.: US 6,609,837 B2  
(45) Date of Patent: Aug. 26, 2003

(54) OPTICAL FIBER ADAPTER FOR DISSIMILAR SIZE FERRULES

(75) Inventor: Norman R. Lampert, Norcross, GA (US)

(73) Assignee: Fitel USA Corp., Norcross, GA (US)

(*) Notice: Subject to any disclaimer, the term of this patent is extended or adjusted under 35 U.S.C. 154(b) by 203 days.

(21) Appl. No.: 09/844,649

(22) Filed: Apr. 27, 2001

(65) Prior Publication Data

US 2002/0159714 A1 Oct. 31, 2002

(51) Int. Cl.[7] .................................................. G02B 6/38
(52) U.S. Cl. ............................................. 385/72; 385/55
(58) Field of Search ......................... 385/72, 70, 73, 385/76, 77, 78, 89, 60, 66, 86, 88, 92, 139

(56) References Cited

U.S. PATENT DOCUMENTS

| 4,268,114 | A |   | 5/1981  | d'Auria et al. ............ 350/96.2 |
| 5,067,783 | A |   | 11/1991 | Lampert ....................... 385/60 |
| 5,082,345 | A |   | 1/1992  | Cammons et al. ............ 385/60 |
| 5,212,752 | A |   | 5/1993  | Stephenson et al. .......... 385/78 |
| 5,274,729 | A |   | 12/1993 | King et al. ................. 385/134 |
| 5,282,259 | A | * | 1/1994  | Grois et al. .................. 385/84 |
| 5,638,474 | A |   | 6/1997  | Lampert et al. .............. 385/78 |
| 5,774,611 | A | * | 6/1998  | Nagase et al. ................ 385/58 |
| 5,781,680 | A | * | 7/1998  | Womack et al. .............. 385/53 |
| 6,102,581 | A |   | 8/2000  | Deveau et al. ................ 385/56 |
| 6,296,398 | B1| * | 10/2001 | Lu .............................. 385/60 |
| 6,318,907 | B1| * | 11/2001 | Schroeder et al. ............ 385/88 |
| 6,402,390 | B1| * | 6/2002  | Anderson et al. ............. 385/88 |

OTHER PUBLICATIONS

U.S. patent application No. 09/282,926; filed Apr. 01, 1999; entitled "Universal Modular Optical Fiber Buildout".
U.S. patent application No. 09/438,311; filed Nov. 10, 1999; entitled Optical Fiber Adapter.

* cited by examiner

Primary Examiner—Robert H. Kim
Assistant Examiner—Thomas R Artman
(74) Attorney, Agent, or Firm—Thomas, Kayden, Horstemeyer & Risley, LLP

(57) ABSTRACT

An optical fiber adapter for coupling first and second dissimilar optical fiber connectors together without signal or coupling degradation has a body portion having a transverse wall. First and second latch gates form chambers for containing an alignment sleeve and one of the chambers has a spring member seated in a recess in the wall at one end of the chamber. The spring member exerts a spring force on the sleeve in opposition to the spring force of one of the connectors, so that the sum of the spring forces on the ferrules of the connectors is substantially zero, thereby insuring proper alignment and positioning of the ferrules.

12 Claims, 3 Drawing Sheets

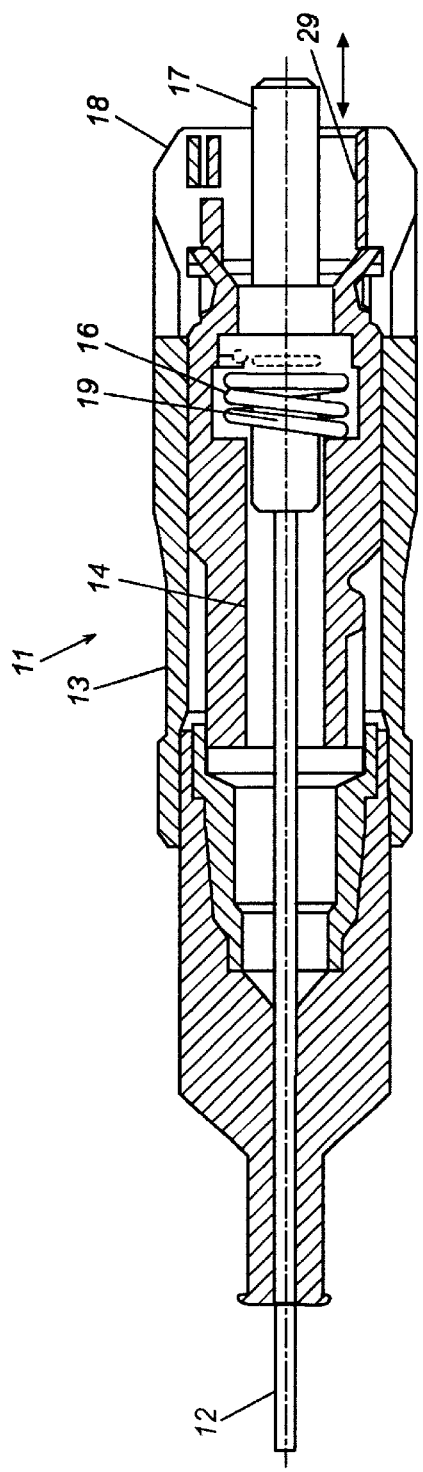
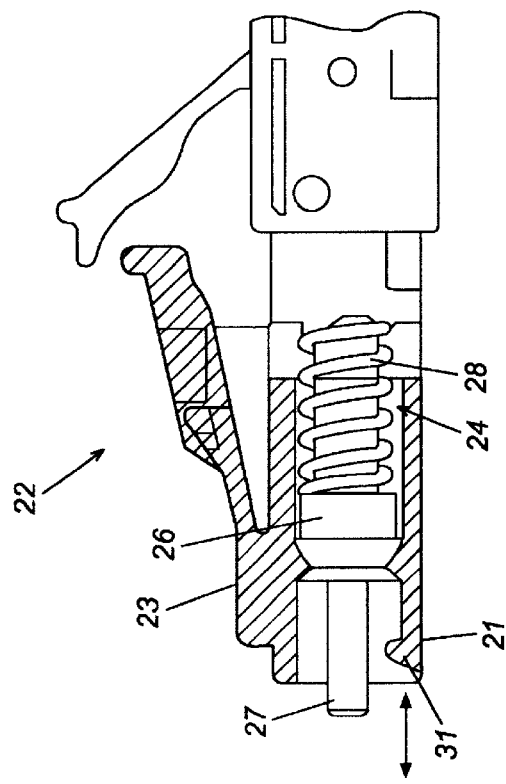
Fig. 1a
Fig. 1b

OPTICAL FIBER ADAPTER FOR DISSIMILAR SIZE FERRULES

RELATED APPLICATIONS

This application is related to U.S. patent application Ser. No. 09/438,311 of Sheldon et al, filed Nov. 10, 1999 and assigned to Lucent Technologies, Inc., the disclosure of which is incorporated herein by reference.

FIELD OF THE INVENTION

This invention disclosed herein relates to optical fiber adapters for coupling a first plug terminated optical fiber cable to a second plug terminated optical fiber cable. In particular, it relates to such an adapter for coupling terminating plugs having dissimilar size ferrules.

BACKGROUND OF THE INVENTION

In the present state of the optical fiber art, optical fibers or cables are generally terminated in plug type connectors, and coupling two fibers together is usually accomplished by use of an adapter which receives the connectors and aligns them in abutting relationship for the low-loss transmission of signals across the junction. An early type of adapter is formed as a tubular body sized and shaped to allow an alignment sleeve to pass therethrough in which the ferrules of the couplers are held in aligned, abutting relationship. An example of such an early type of coupling is disclosed in U.S. Pat. No. 5,082,345 of Cammons et al., which is adapted to couple two of the same type of optical fiber connectors together. In the Cammons patent, the ferrule of one of the connectors is introduced into one end of the alignment sleeve and the combination thus formed is passed into the adapter body. The second connector is then inserted into the adapter and its ferrule inserted into the other end of the alignment sleeve. Later developments have produced adapters wherein the alignment sleeve is contained within the adapter into which both connectors are inserted, such as is shown in U.S. Pat. No. 5,212,752 of Stephenson et al.

There have has been developed a large number of fiber (or cable) terminating connectors, some serving certain specific operational purposes, others by way of improved economy of manufacture, and others for simplicity of construction and/or use. Thus, there are differing connectors bearing the designations SC, ST®, FC, LC, and MU, all of which are widely used, giving rise to the situation where, quite often, a cable having a terminating connector of one type is to be connected to a cable having a termination of a different type. An early solution to this problem is disclosed in U.S. Pat. No. 5,067,783 of Lampert et al., which discloses an optical fiber adapter or build-out system comprising first and second pieces, each for receiving a particular connector differing from the other and which, when joined together, permitted coupling of FC to ST®, as well as FC to FC and ST® to ST®. Although the Lampert et al. invention represents an advance in the art, the problem remains that new connector developments, such as the LC and the SC connectors, must be accommodated, and thus a more universal coupling apparatus is needed. U.S. Pat. No. 5,274,729 of King et al. discloses a universal build-out system which solves the ongoing problem of coupling the plethora of differing types of connectors together, and allows for the connection of SC, ST®, and FC connectors to one another, in any combination as desired. More recently, in U.S. patent application Ser. No. 09/282,926; filed Apr. 1, 1999, and entitled "Universal Modular Fiber Build-Out", there is disclosed a system for coupling not only the large 2.5 mm diameter ferrules of SC, ST®, and FC connectors to one another, but also implementing, for the first time, the coupling of the small 1.25 mm diameter ferrules of the LC connector to the large diameter ferrule of the SC, ST®, and PC connectors. The alignment sleeve can take the form of a stepped sleeve of the two differing diameters. The aforementioned Sheldon et al. application Ser. No. 09/438,311 discloses similar arrangements wherein the adapter or build-out is of one piece instead of the more common two piece arrangement, thereby resulting in a less costly device.

It is standard in all of the commonly used connectors that the ferrule is movable in translation and is biased toward the coupling end of the connector generally by means of a coil spring. In a standard adapter each ferrule is biased beyond the plane of contact until the connectors are seated within the adapter, at which position the ferrules abut each other with substantially equal force and retreat from their forward position to where the plane of contact is substantially centered within the adapter, and the forces on the ferrules being equalized, the ferrules are able to move or float together in the axial direction, thereby maintaining proper alignment. However, if one of the springs has substantially greater force than the other, or if one connector has no spring, that ferrule will advance forward within the adapter until it encounters a surface that stops further movement and, as a consequence, proper alignment is degraded, the ferrules being no longer "floating". Thus, even though the stepped sleeve accommodates the different diameter ferrules, the sleeve itself will be moved out of position due to the force of the stronger spring. When, for example, the adapter is designed to couple the large diameter (2.5 mn) ferrule of an SC type connector to the smaller diameter (1.25 mm) ferrule of the LC or MU type connector, the spring of the SC connector provides approximately two and two-tenths (2.2) pounds of force, which easily overcomes the one and two tenths (1.2) pounds of force provided by the spring of the LC or MU type connector thereby pushing the smaller ferrule out of the plane of contact, with consequent degraded alignment.

SUMMARY OF THE INVENTION

The present invention is an adapter, comprising either a one piece or a two piece body, that contains a stepped alignment sleeve for receiving, at one end, a large diameter ferrule and, at the other end, a small diameter ferrule which sleeve is contained within the adapter by means of latch gates which allow some translational movement of the sleeve. The adapter itself is sized and shaped at one end to receive a first optical fiber connector, having, for example, a large diameter ferrule, and sized and shaped at the other end to receive a second optical fiber connector having a small diameter ferrule, as taught in the aforementioned Sheldon et al. application, and the stepped alignment sleeve is adapted to receive the ferrules thereof. A transverse wall portion within the adapter from either side of which axially extend the latch gates has a circular recess on the wall side from which extends the latch gate which contains the enlarged portion of the stepped alignment sleeve. Within the recess is mounted or positioned a spring member such as a Belleville spring or, alternatively, a coil spring, or an elastomeric spring such as an O-ring, which is adapted to bear against the shoulder formed in the stepped alignment sleeve at the junction of the two differing diameters thereof. Where, for example, the large diameter portion of the sleeve is to receive the large ferrule of an SC connector, whose spring exerts approximately two and two-tenths (2.2.) pounds of force, and the small diameter portion of the sleeve receives the ferrule of an LC type connector, whose spring exerts approximately one and two-tenths (1.2) pounds of force, the adapter spring in the recess exerts approximately one pound of force against the enlarged portion of the alignment sleeve. This one pound force works against the two and two-tenths pounds of the SC connector spring so that it is, in effect, reduced to the one and two-tenths pounds of force of the LC connector spring and the alignment sleeve floats within the chamber formed by the latch gates, thereby preventing degradation of alignment.

The invention is applicable to any of a number of combinations of connectors having dissimilar spring biasing forces with the principles and features thereof being applicable thereto, including the situation, where one of the connectors has no biasing force. A further understanding of these principles and features may be had from the following detailed description, read in conjunction with the accompanying drawings.

DESCRIPTION OF THE DRAWINGS

FIG. 1a is an elevation view, partially in cross-section, of an SC type of optical fiber connector;

FIG. 1b is an elevation view, partially cross-section, of an LC type of optical fiber connector;

FIG. 4b is an elevation view of the detail of FIG. 4a; and

FIG. 5 is an elevation view of a different embodiment of the detail of FIG. 4a.

DETAILED DESCRIPTION

Figure 2:
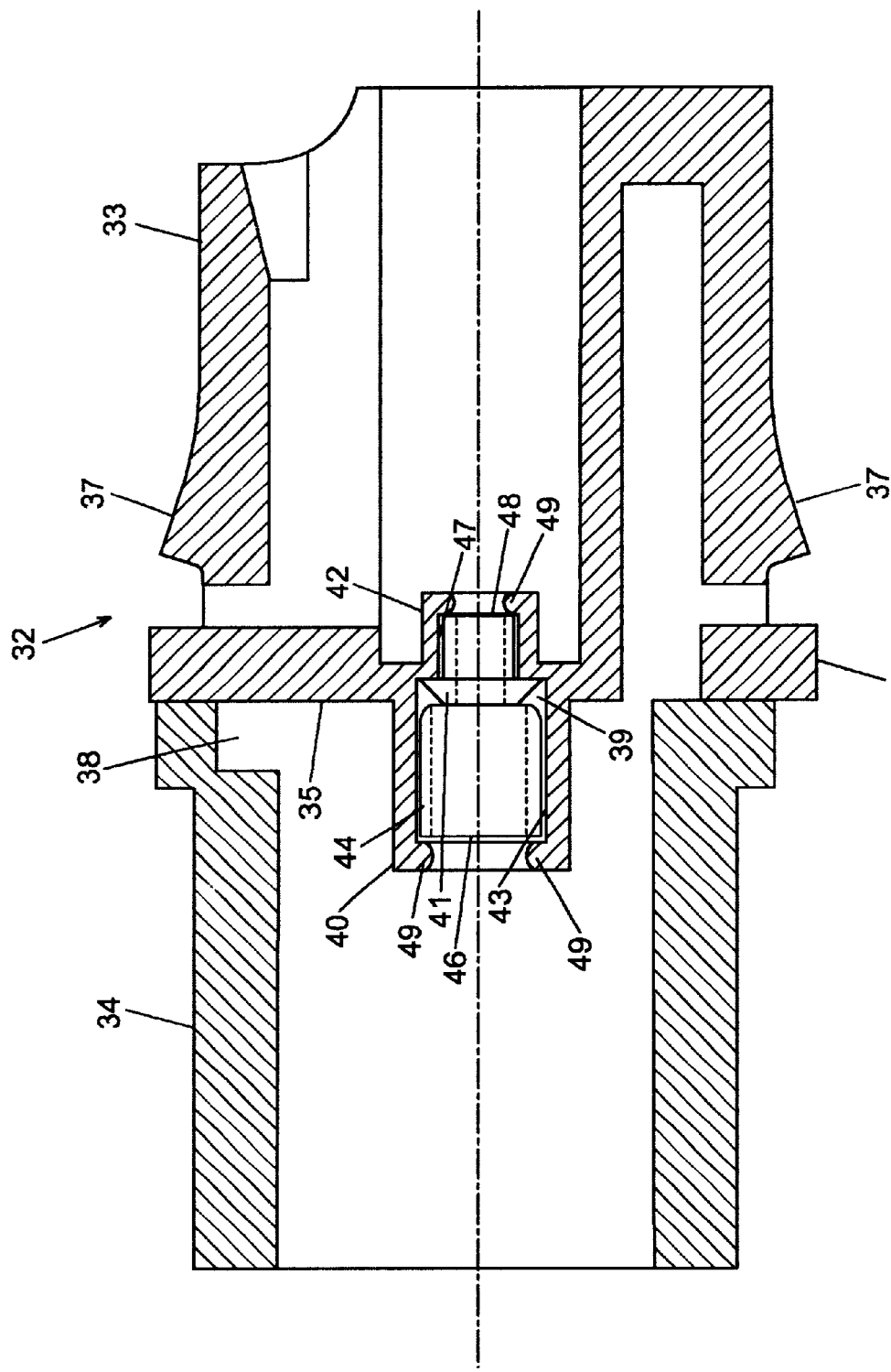
FIG. 2 is an elevation view in cross-section of a coupling adapter in a preferred embodiment of the invention.

The principles and features of the present invention are applicable for use with virtually all optical fiber connectors and adapters. However, for simplicity, they are illustrated hereinafter as used in an adapter for coupling an SC type connector having a large diameter ferrule (2.5 mm) to an LC type connector having a small diameter ferrule (1.25 mm). It will be understood that the features of the invention are also applicable to those situations wherein the ferrule diameters of the connectors may be substantially the same, but the spring forces on the ferrules are sufficiently different to cause misalignment.

In FIG. 1 there is shown an SC type connector 11 in cross-section terminating a buffered optical fiber 12. As can be seen, connector 11 comprises a housing 13 having a bore 14 therein which contains a barrel assembly 16 having a ferrule 17 at the connector end 18 of the connector. A coil spring 19 supplies a forward bias to ferrule 17, as discussed hereinbefore, and the ferrule 17 is movable in translation or axially over a limited range, as indicated by the arrow. FIG. 1b depicts, partially in cross-section, the connector end 21 of an LC type connector 22 which comprises a housing 23 having a bore 24 therein which contains a barrel assembly 26 having a ferrule 27 which projects out of the connector end 21. A coil spring 28 applies a bias to the barrel assembly 26, as discussed previously, and hence ferrule 27 is axially movable over a limited distance as indicated by the arrow. The ferrule 17 of the SC connector 11 is housed in an enlarged bore 29 and the ferrule 27 of the LC connector 22 is housed in an enlarged bore 31, as shown. The connectors 11 and 22 are standard connectors in wide use, and, as discussed previously, have different spring forces acting on their ferrules which can lead to degradation of the coupling, with resultant signal degradation when they are coupled together.

FIG. 2 depicts the adapter 32 of the present invention comprising a first receptacle (jack) 33 for receiving the LC type connector 22 therein and a second receptacle 34 for receiving the SC type connector 11 therein. Receptacle or jack 33 is a standard LC type jack as is shown and described in U.S. Pat. No. 5,638,474, the disclosure of which is incorporated herein by reference, as will be explained hereinafter, and has a flange 36 and front wall 35. Flange 36 and latches 37 function to secure the receptacle or jack 33 to a panel, for example, not shown. Receptacle 34 is a standard type SC jack such as is shown in U.S. Pat. No. 5,212,752 of Stephenson et al., the disclosure of which is incorporated herein by reference, and is attached to jack 33 by suitable means, shown in FIG. 2, as press fit pin 38. Other means for jointing receptacle 33 and 34 such as ultrasonic bonding or incorporating as a unitary adapter housing may be used. Together, receptacles 33 and 34 form an elongated adapter body.

Figure 3:
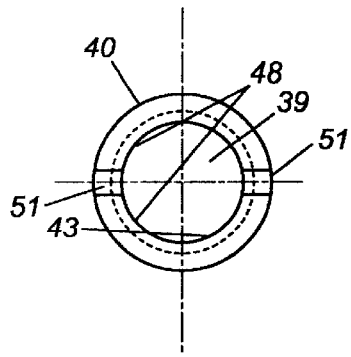
FIG. 3 is a front elevation view of a detail of the adapter of FIG. 2.

In accordance with the present invention, wall 35 has a latch gate 40 extending therefrom into jack 34, at the interior base of which is a circular recess 39 which contains a spring member 41. Extending from the opposite side of wall 35 is a second latch gate 42. The exterior dimension (diameter) of gate 40 is less than the interior diameter of enlarged bore 29 of the SC connector 11 and the diameter of gate 42 is less than the inside diameter of enlarged bore 31 of LC connector 22. It can be seen that latch gate 40 forms a chamber 43 which contains the large diameter portion 44 of a stepped ferrule alignment sleeve 46 and latch gate 42 similarly defines a chamber 47 which contains the small diameter portion 48 of the stepped alignment sleeve 46. Alignment sleeve 46 is preferably made of metal or, for instance, plastic or ceramic material. Latch gates 40 and 42 are preferably made of the same plastic material as the jacks 33 and 34. Preferably the latch gate 40 has to be sufficiently resilient to allow alignment sleeve 46 to be forced into the containment chambers 43 and 47 and, when the sleeve 46 is within the chambers, they snap into the position shown to hold sleeve 46 within the chambers 43 and 47 while allowing some movement thereof. To this end, as is characteristic of latch gates, such as are shown in the aforementioned Sheldon et al. patent application Ser. No. 09/438,311, the distal ends of the gates 40 and 42 have enlarged ridges 49 thereon. FIG. 3 is an end view of the latch gate 40, showing splits 51 which allow the gate 40 to flex as stepped alignment sleeve 46 is being inserted through the gate into the chambers 43 and 47. An end view of gate 42 would be similar, but the splits 51 are not required.

In operation, connector 11 is inserted into jack 34 and its ferrule 17 into the large diameter portion 44 of alignment sleeve 46, and connector 22 is inserted into jack 33 and its ferrule 27 into the small diameter portion 48 of sleeve 46. Coil spring 19 of the SC connector 11, being stronger than spring 28 of LC connector 22, in the absence of spring member 41, spring 19 would tend to overcome spring 28 until sleeve 46 bottomed in recess 39, thereby shifting the plane of abutment of the two ferrule 17 and 27. However, spring member 41 bears against the shoulder 52, best seen in FIG. 4b, and supplies a bearing force to sleeve 46 in opposition to that supplied by spring 19. As pointed out hereinbefore, the force of spring member 41 is substantially equal to the force difference between springs 19 and 28, so that the stepped sleeve 46 is prevented from bottoming in recess 39, and the plane of abutment of the ferrules does not shift, and the junction is not mis-aligned.

Figure 4A:
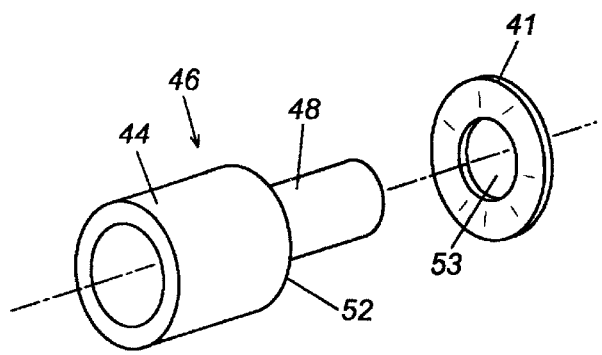
FIG. 4a is a perspective view of a detail of the adapter of FIG. 2.
Figure 4B:
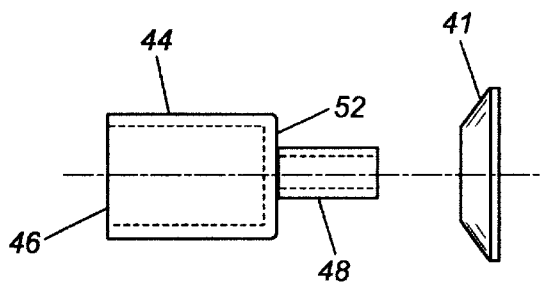
Figure 5:
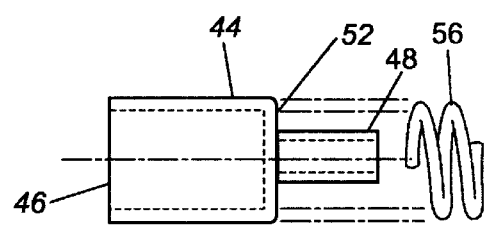

FIG. 4 is a perspective view of the alignment sleeve 46 and the spring member 41, shown as a Belleville spring having a central hole 52 to allow passage of the small diameter portion 48 of sleeve 46 therethrough. FIG. 4b is a side elevation view of the arrangement of FIG. 4a. It can be seen that the junction of portions 44 and 48 of sleeve 46 forms a shoulder 52 against which spring member 41 bears. For easier insertion of sleeve 46 into latch gates 40 and 42, the junction end of large diameter portion 44 at the shoulder 52 has a rounded edge. FIG. 5 is a view similar to that of FIG. 4b in which the spring member is a coil spring 56. The operation is the same as that with the Belleville spring, with the coil spring being seated in recess 39 and bearing against shoulder 52.

The features of the present invention have been illustrated herein in an embodiment for coupling SC and LC connectors together. It is to be understood that the same principles can be used for coupling other types of connectors together where there is a difference in the bias forces applied to the ferrules thereof. In addition, the apparatus of the preferred embodiment is a coupling adapter having two parts. It is to be understood that the principles and features of the present invention are equally applicable to a unitary or once piece adapter similar to those disclosed in the aforementioned Sheldon et al. application. It is further to be understood that the introduction of combinations of different diameter ferrules with a fiber stub and with either one or two cylindrical alignment sleeves will also require force balancing. Using two sleeves, the adapter serves the same purpose but obviates the requirement of a precision stepped sleeve.

It is further to be understood that the various features of the present invention, in being incorporated into other types of coupling arrangements might be subject to various modifications or adaptations to achieve force balancing in accordance with the present invention which might occur to workers in the art. All such variations, adaptations, or modifications are intended to be included herein as being within the scope of the invention as set forth herein. Further, in the claims hereinafter, the corresponding structures, materials, acts and equivalents of all means or step-plus-function elements are intended to include any structure, materials, or acts for performing the functions in combination with other elements as specifically claimed.

What is claimed is:

1. An adapter for coupling a first optical fiber connector to a second optical fiber connector, each of the connectors having a ferrule extending therefrom and at least one connector having an axial spring biasing force applied to its ferrule, said adapter comprising:

an elongated substantially hollow body having a longitudinal axis, said body having a first end and a second end spaced therefrom;

said first end being sized and shaped to receive the first optical connector therein and said second end being sized and shaped to receive the second optical connector therein;

a tubular alignment sleeve axially positioned within said body for receiving the ferrules of the first and second connector; and an axial biasing force member positioned within said body for applying a an axial biasing force to one of the ferrules in said sleeve in opposition to the axial spring biasing force applied thereto.

2. An adapter as claimed in claim 1 wherein said tubular alignment sleeve is stepped from a first diameter portion for accommodating a first connector ferrule of a first diameter to a second diameter portion, wherein the second diameter is less than the first diameter, to accommodate a second connector ferrule of smaller diameter than that of the first connector ferrule.

3. An adapter as claimed in claim 2 wherein said first and second portions of said alignment sleeve form a peripheral shoulder on the exterior thereof.

4. An adapter as claimed in claim 3 wherein said body has a transverse wall therein having a recess portion coaxial with the axis of said body.

5. An adapter as claimed in claim 4 wherein said wall has first and second surfaces and a first latch gate extending from said first surface and a second latch gate extending from said second surface, for containing said tubular alignment sleeve.

6. An adapter as claimed in claim 4 wherein said biasing force member is seated in said recess and bears against said sleeve.

7. An adapter as claimed in claim 6 wherein said biasing force member bears against said peripheral shoulder.

8. An adapter as claimed in claim 1 wherein said biasing force member comprises a Belleville spring.

9. An adapter as claimed in claim 8 wherein said Belleville spring has a central hole through which a portion of said alignment sleeve passes.

10. An adapter as claimed in claim 1 wherein said biasing force member comprises a coil spring.

11. An adapter as claimed in claim 10 wherein said coil spring surrounds a portion of said alignment sleeve.

12. An adapter as claimed in claim 10 wherein said coil spring surrounds a portion of said alignment sleeve.

* * * * *